US012749318B2

(12) United States Patent
Dixit et al.

(10) Patent No.: US 12,749,318 B2
(45) Date of Patent: Sep. 29, 2026

(54) OCCLUDED OBJECT DETECTION AND CORRECTION FOR VEHICLE APPLICATIONS

(71) Applicant: QUALCOMM Incorporated, San Diego, CA (US)

(72) Inventors: Deeksha Dixit, San Diego, CA (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 18/311,784

(22) Filed: May 3, 2023

(65) Prior Publication Data

US 2024/0371168 A1 Nov. 7, 2024

(51) Int. Cl.
*G06V 20/56* (2022.01)
*G06V 10/26* (2022.01)

(52) U.S. Cl.
CPC .............. *G06V 20/56* (2022.01); *G06V 10/26* (2022.01)

(58) Field of Classification Search
CPC ......... G06V 20/56; G06V 10/26; G06V 10/25
See application file for complete search history.

(56) References Cited

U.S. PATENT DOCUMENTS

2018/0232947 A1* 8/2018 Nehmadi ................ G01S 13/86
2019/0094875 A1* 3/2019 Schulter .................. G06T 7/514
2020/0204732 A1* 6/2020 Yadav ........................ B60R 1/27

OTHER PUBLICATIONS

Ao J., et al., "Image Amodal Completion: A Survey", Arxiv.Org, Cornell University Library, 201 Olin Library Cornell University Ithaca, NY 14853, arXiv:2207.02062v2 [cs.CV], Dec. 16, 2022, XP091395424, pp. 1-20, The Whole Document.
International Search Report and Written Opinion—PCT/US2024/017699—ISA/EPO—Jul. 4, 2024 (2300642WO).
Ke L., et al., "Occlusion-Aware Video Object Inpainting", 2021 IEEE/CVF International Conference on Computer Vision (ICCV), IEEE, Oct. 10, 2021, pp. 14448-14458, XP034092477, pp. 14468-14478, Section 3, Section 4.

(Continued)

*Primary Examiner* — Sath V Perungavoor
*Assistant Examiner* — Tyler B Edwards
(74) *Attorney, Agent, or Firm* — Norton Rose Fulbright US LLP/QUALCOMM Incorporated

(57) ABSTRACT

This disclosure provides systems, methods, and devices for vehicle driving assistance systems that support image processing. In a first aspect, a method is provided that includes generating a top view image of an object using a plurality of images captured from different views. The method involves determining portions of the images that depict the object and generating novel views of the object from at least one novel view not present within the plurality of images. Corresponding portions containing an occluded view and an unobstructed view of the object are identified and corrected views for occluded views are determined based on corresponding unobstructed views using a machine learning model. A top view image may be then generated based on the corrected views. The invention enables improved visibility for autonomous driving systems in situations where objects are occluded or partially obstructed. Other aspects and features are also claimed and described.

30 Claims, 7 Drawing Sheets

(56) References Cited

OTHER PUBLICATIONS

Liu B., et al., “Weakly But Deeply Supervised Occlusion-Reasoned Parametric Road Layouts”, 2022 IEEE/CVF Conference on Computer Vision and Pattern Recognition (CVPR), IEEE, Jun. 18, 2022, pp. 16979-16988, XP034194983, pp. 17000-17009, Section 3, Section 4.

Mani K., et al., “MonoLayout: Arnodal Scene Layout From a Single Image”, Arxiv.Org, Cornell University Library, 201 Olin Library Cornell University Ithaca, NY 14853, arXiv:2002.08394v1 [cs.CV], Feb. 19, 2020, XP081603880, pp. 1-7, Section 3, Section 4.

Yan X., et al., “Visualizing the Invisible: Occluded Vehicle Segmentation and Recovery”, 2019 IEEE/CVF International Conference on Computer Vision (ICCV), IEEE, Oct. 27, 2019, pp. 7617-7626, XP033723078, pp. 7617-14458, Section 3, Section 4.

* cited by examiner

OCCLUDED OBJECT DETECTION AND CORRECTION FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

One aspect includes a method for image processing that includes receiving a first plurality of images. The method also includes determining first portions of at least a subset of the first plurality of images that depict an object. The method also includes determining a second plurality of images based on the first plurality of images. The method also includes determining second portions of at least a subset of the second plurality of images that depict the object. The method also includes determining, from among the first portions and the second portions, corresponding portions that contain an occluded view of the object and an unobstructed view of the object. The method also includes determining, for at least a subset of the corresponding portions, corrected views for occluded views based on corresponding unobstructed views, where the corrected views at least partially correct for occlusion of the object within the occluded views. The method also includes determining a top view image based on the corrected views.

Another aspect includes an apparatus that includes a memory storing processor-readable code and at least one processor coupled to the memory. The at least one processor may be configured to execute the processor-readable code to cause the at least one processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining, from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views.

Another aspect includes a non-transitory computer-readable medium storing instructions that, when executed by a process, cause the processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining. from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views.

Another aspect includes a vehicle that includes a memory storing processor-readable code and at least one processor coupled to the memory. The at least one processor may be configured to execute the processor-readable code to cause the at least one processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining, from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FRI and FR2 are often referred to as mid-band frequencies. Although a portion of FRI is greater than 6 GHZ, FRI is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
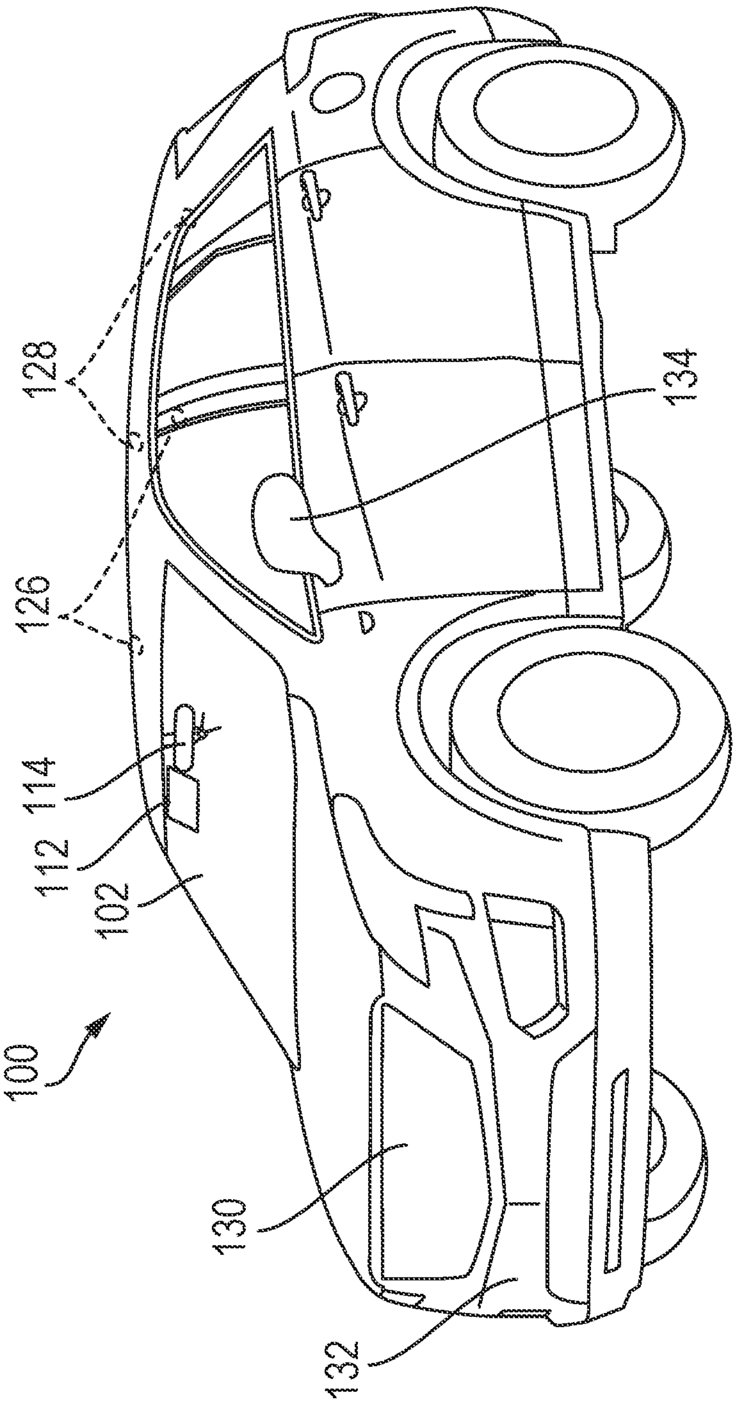
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In certain implementations, generating ground truth masks for the novel task of amodal segmentation for perspective view and top view images may be a challenging task. Human annotators may produce noisy labels due to differences in interpretation of object shapes, and clip art-based datasets may be unable to handle complex backgrounds and result in unwanted artifacts due to duplication and reuse of certain objects. Synthetic datasets have their own problems and often suffer from domain gaps, making it difficult to generate clean ground truth masks for top view segmentation. Solving these issues (such as in a semi-supervised manner) may assist with multiple downstream advanced driver assistance systems (ADAS) that depend on panoptic scene segmentation, such as path planning. Additionally, making amodal segmentation time consistent improve ADAS robustness reducing ADAS errors in complex scenes and further reducing the computing resources necessary to perform such processing.

One solution to this problem is by generating a top view image of an area surrounding a vehicle. One such method may include receiving a first plurality of images captured from cameras on the vehicle. The first plurality of images may depict one or more areas surrounding the vehicle. In certain implementations, the method further involves determining first portions of at least a subset of the first plurality of images that depict an object. The first portions may be determined on a pixelwise basis to identify pixels within at least the subset of the first plurality of images that depict the object. The first portions may be masks identifying portions of the first plurality of images that contain the object. The masks may be in various forms, such as matching contours or pixels of the object, bounding boxes for the object, polygons for the object, and the like. Additionally, the method may involve determining second portions of at least a subset of a second plurality of images that depict the object. The second plurality of images may be generated using a machine learning model and may depict the object from at least one novel view not present within the first plurality of images. From among both sets of portions (such as from among both sets' corresponding mask areas in the image), corresponding portions are identified that contain an occluded view and an unobstructed view. For example, these pairs can be identified by detecting pairs where one image contains an occluded state for an object while another contains it in visible or unobstructed form. In certain implementations, using machine learning models, corrected views for occluded views are determined based on corresponding unobstructed views for each respective corresponding portion. Specifically, for the corresponding portions, corrected views can be generated using machine learning models trained to fill in missing parts based on what may be visible in other frames. Based on these corrected views and unobstructed views depicting objects over time via multiple frames one or more top view images may be generated.

Stated differently, amodal segmentation for ADAS requires reasoning beyond the visible pixels in the scene. It involves inference of segmentation mask for both the visible and occluded regions of a target object. As top view images are rich in spatial context, they are easy to interpret for downstream tasks (such as path planning, navigation, and driving decisions in ADAS). Generating ground truth masks for amodal segmentation for perspective view and top view images may be challenging. The present disclosure discusses various techniques for such top view and perspective view amodal segmentation. To train a model, both training images and novel view images may be decomposed into layers based the number of objects in the image and the depth values corresponding to each object, such that each layer contains a mask for one object. Mining may be performed on pairs of images for an object such that one of the images contains the object in an occluded state while the other contains the object in a visible state. Segmentation masks from both the objects are generated, converted to a top view image, and confidence scores may calculated.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the discussed techniques reduce the complexity and accuracy issues when generating ground truth masks for amodal segmentation and top view image determination. By leveraging depth information and mining pairs of images, these techniques may generate consistent segmentation masks for objects in both visible and occluded states, which can be used to train amodal segmentations on datasets where annotations are not available. Such techniques can accordingly improve perception in various computer vision applications, particularly in autonomous driving systems where accurate perception may be critical for safe operation.

Another key advantage may be that these techniques can be used to train models on datasets where annotations are not available, providing a solution for training on unlabeled datasets. The pipeline can also generate cleaner masks in datasets annotated by human annotators and assist in generating diverse and exhaustive augmentations for datasets with amodal masks. Additionally, the confidence score generated by the pipeline can be used to analyze the quality of predicted masks, potentially leading to safer systems. The segmentation masks generated using this methodology will also be consistent across time and flicker-free. Furthermore, by ensuring more accurate training data for models that use the resulting top view images as ground truth, these techniques may reduce the amount of time and computing resources required to train ADAS models. Relatedly, resulting models trained based on the present techniques may be more accurate and efficient given the improved training data, resulting in faster operation and fewer computing resources necessary at inference time (such as during deployment of the model).

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or in a forward direction. In some embodiments, an additional camera may be located at the rear of the vehicle 100 and oriented such that the field of view of the additional camera captures a scene behind the vehicle 100 in the direction that the vehicle 100 is moving when in reverse mode or in a reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the vehicle 100 is traveling in a forward direction may likewise be obtained while the vehicle 100 is traveling in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
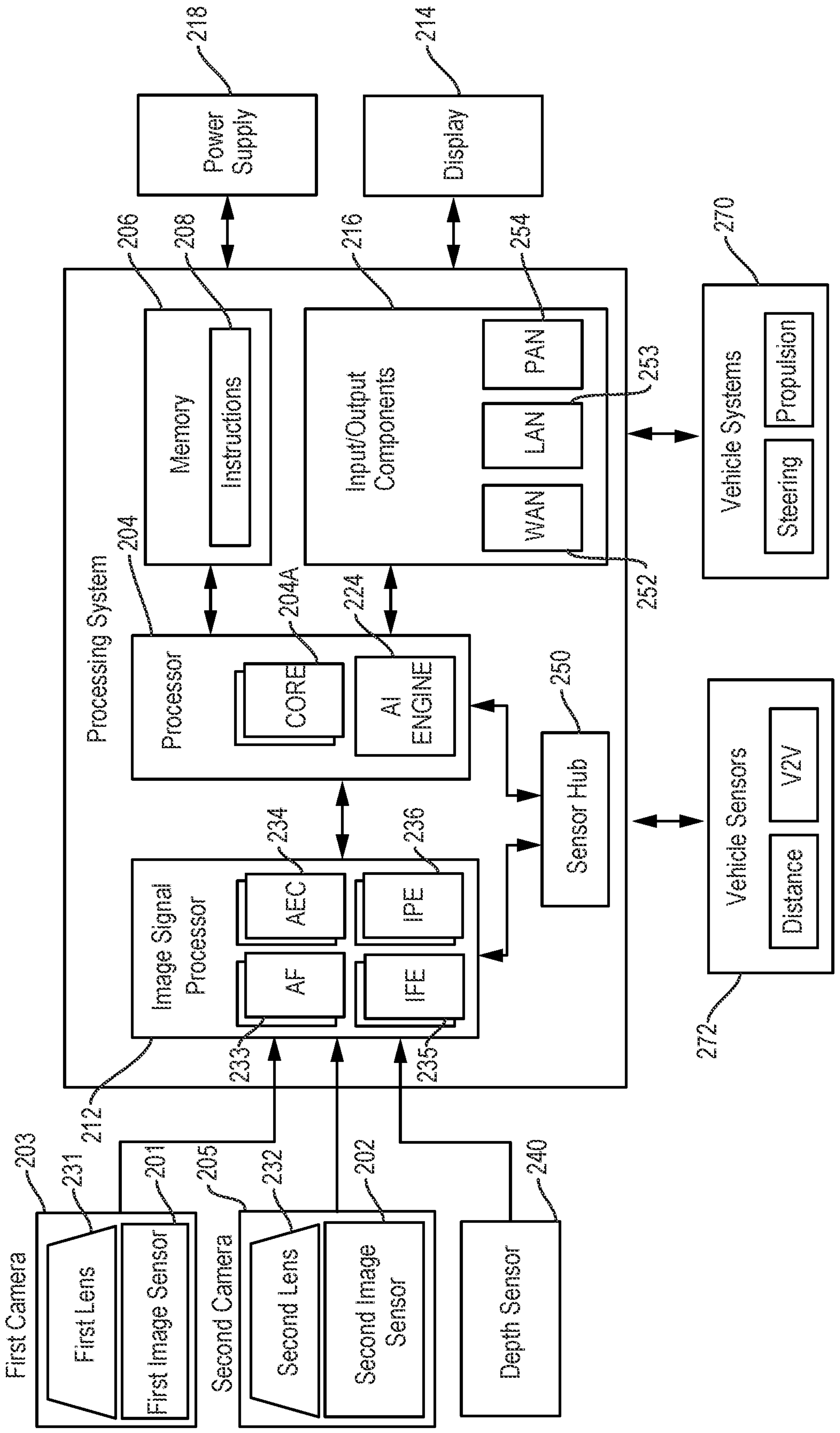
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
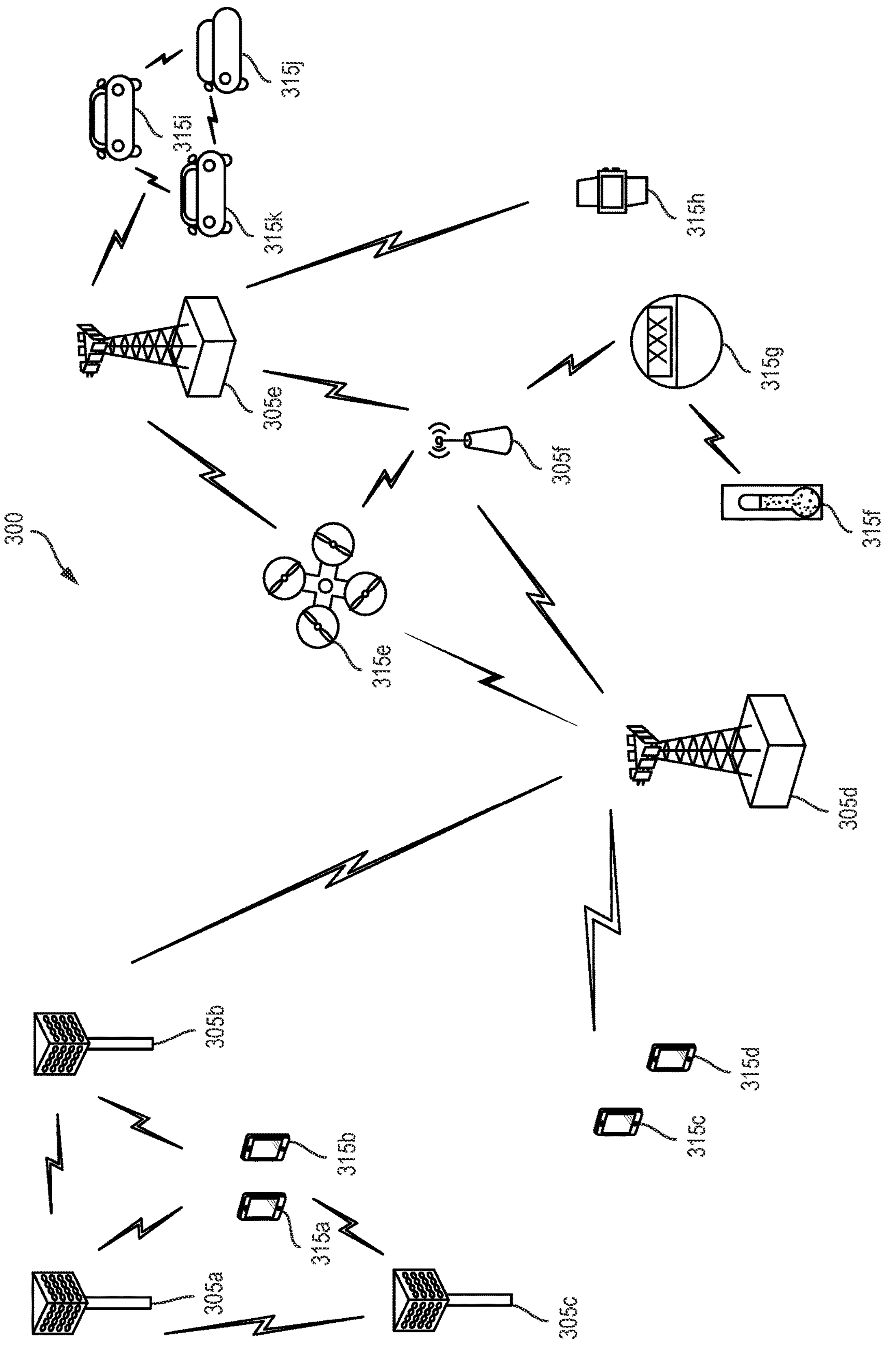
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage arca, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*c*.

Figure 4:
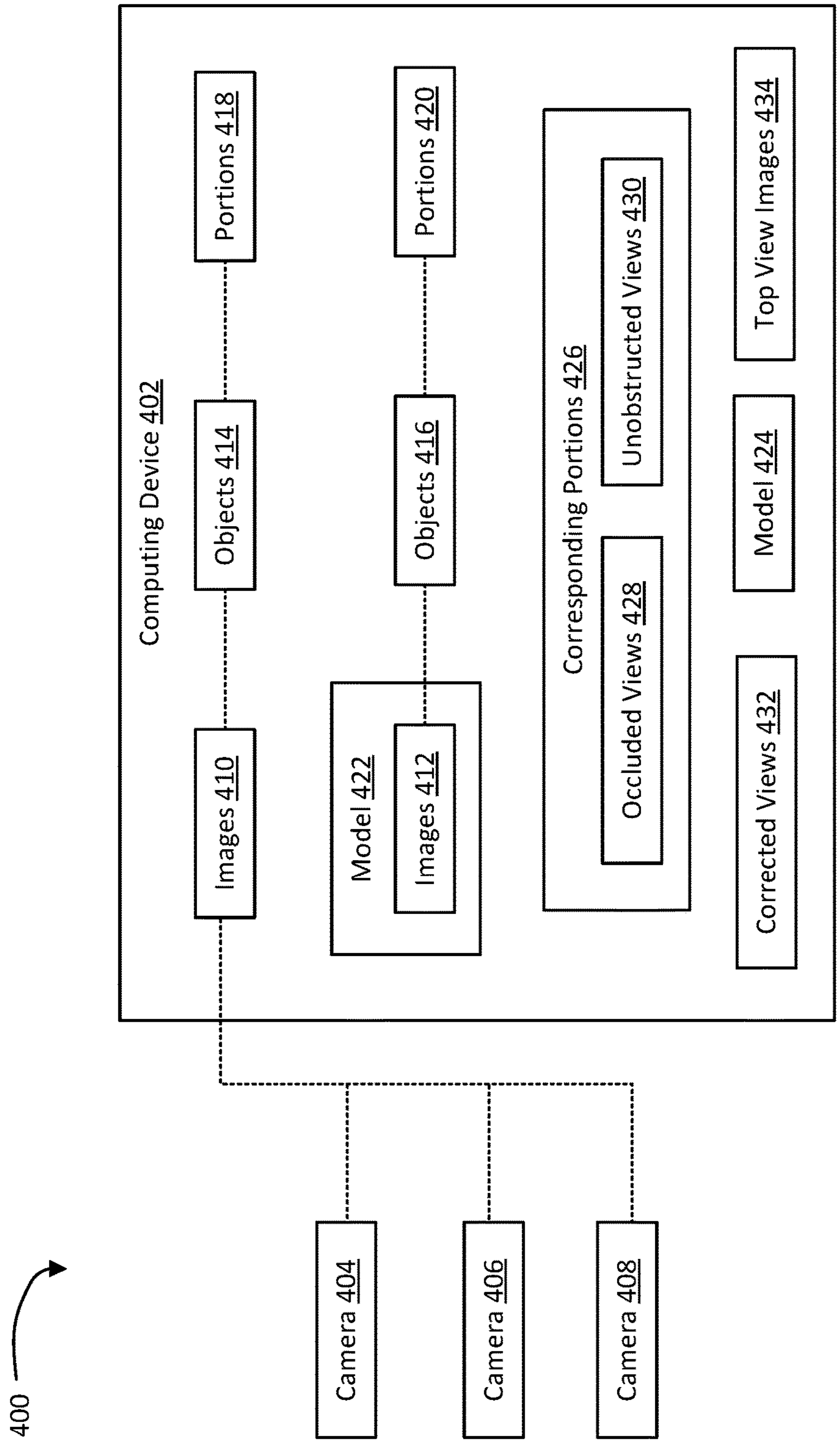
FIG. 4 is a block diagram illustrating a system for occluded object detection and correction according to an exemplary embodiment of the present disclosure.

Aspects of the vehicular systems described with reference to, and shown in, FIG. 1, FIG. 2, and FIG. 3 may include occluded object detection and correction. For example, FIG. 4 is a block diagram illustrating a system 400 for occluded object detection and correction according to an exemplary embodiment of the present disclosure. The system 400 includes cameras 404, 406, 408 and a computing device 402. The computing device 402 includes a first plurality of images 410, first portions 418 of the images 410, objects 414, 416, models 422, 424, second portions 420 of the images 412, corresponding portions 426, corrected views 432, and top view images 434. The model 422 includes a second plurality of images 412. The corresponding portions 426 include occluded views 428 and unobstructed views 430.

The computing device 402 may be configured to perform occluded object detection and correction for top view image generation based on images received from the cameras 404, 406, 408. In particular, the computing device 402 may be configured to receive a first plurality of images 410. In certain implementations, the first plurality of images 410 depict one or more areas surrounding a vehicle. For example, the first plurality of images 410 may be captured from cameras 404, 406, 408 located on a vehicle (such as mounted or otherwise attached to the vehicle). In certain implementations, the vehicle may also contain the computing device 402. In certain implementations, the plurality of images 410 may include multiple views of one or more objects captured from multiple viewing angles (such as viewing angles relative to the object). In certain implementations, at least a subset of the multiple views are captured at different times, such as by the same camera, by different cameras, or combinations thereof.

The computing device 402 may be configured to determine first portions 418 of at least a subset of the first plurality of images 410 that depict an object. For example, the computing device 402 may determine portions 418 of the images 410 that correspond to individual objects 414 within the images 410. In certain implementations, the portions 418 may correspond to a particular, specified object 414 (such as an object identified by a requesting user or another computing process). In additional or alternative implementations, the portions 418 may be identified for multiple objects 414, 416 identified within the images 410 (such as all of the objects recognized within the images 410, a subset of the objects recognized within the images 410, or combinations thereof).

Figure 5A:
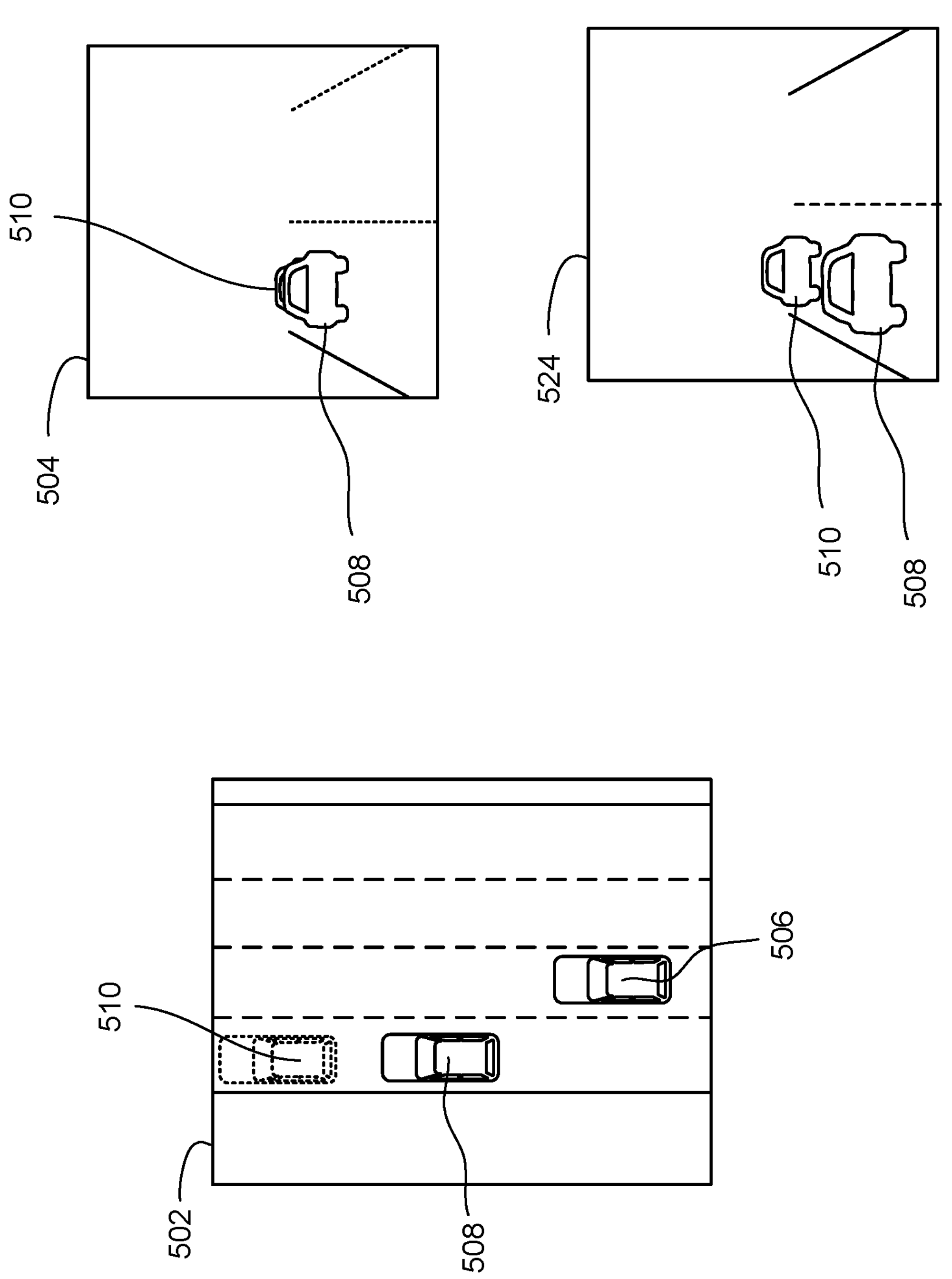
FIGS. 5A-5B depicts images according to exemplary embodiments of the present disclosure.

In certain implementations, the first portions 418 may be identified as masks identifying portions of the first plurality of images 410 that contain the object 414. In certain implementations, the portions 418 may be determined on a pixelwise basis to identify pixels within at least a subset of the first plurality of images 410 that depict the object. In certain implementations, the portions 418 may exactly match the contours pixels of the object 414 within the images 410. In additional or alternative implementations, the portions 418 may include additional portions of the images 410, such as a buffer zone around the object 414, a bounding box for the object 414, a bounding polygon for the object 414, and the like. As one specific example, FIG. 5A depicts an image in which a first vehicle 510 is occluded by a second vehicle 508. A mask 511 may be determined for an area in which the object is located. As shown in FIG. 5A, the mask 511 may include occluded portions of the object.

In certain implementations, the first plurality of images 410 depict multiple objects 414, 416. In such instances, portions 418 may be separately identified for each of the multiple objects 414 within the images 410. In certain implementations, the portions 418 may include or otherwise be associated with corresponding identifiers of the objects 414 whose locations are identified. For example, the portions 418 may be stored as masks of corresponding images 410 in association with identifiers of the objects. In such implementations, the object may be a current object in a processing pipeline for the first plurality of images 410 (such as from among the objects 414). In such instances, the computing device 402 may repeat any of the described processing for each of at least a subset of the objects 414. For example, the computing device 402 may be configured to iterate through each of at least a subset of the objects 414, 416 when generating top view images 434. As a particular example, the computing device 402 may finish processing (such as determining corresponding portions 426 and corrected view 432 for all of the objects 414, 416) before determining the top view images 434.

In certain implementations, detection of objects 414 and their corresponding portions 418 within the images 410 may be performed using a machine learning model trained based on an end-to-end pipeline for object detection, where both training images and novel view images are decomposed into k-stacked layers based on the number of objects present in the image and their corresponding depth values. Each layer may contain a mask for one object, which is used for training a decoder model to identify the objects and determine their distance in the image. The decoder may then assigns unique object IDs and pixelwise masks to each detected object. In certain implementations, collections of multiple masks for multiple images that correspond to one or more objects may be referred to as a "segmentation map" of the images.

Figure 5B:
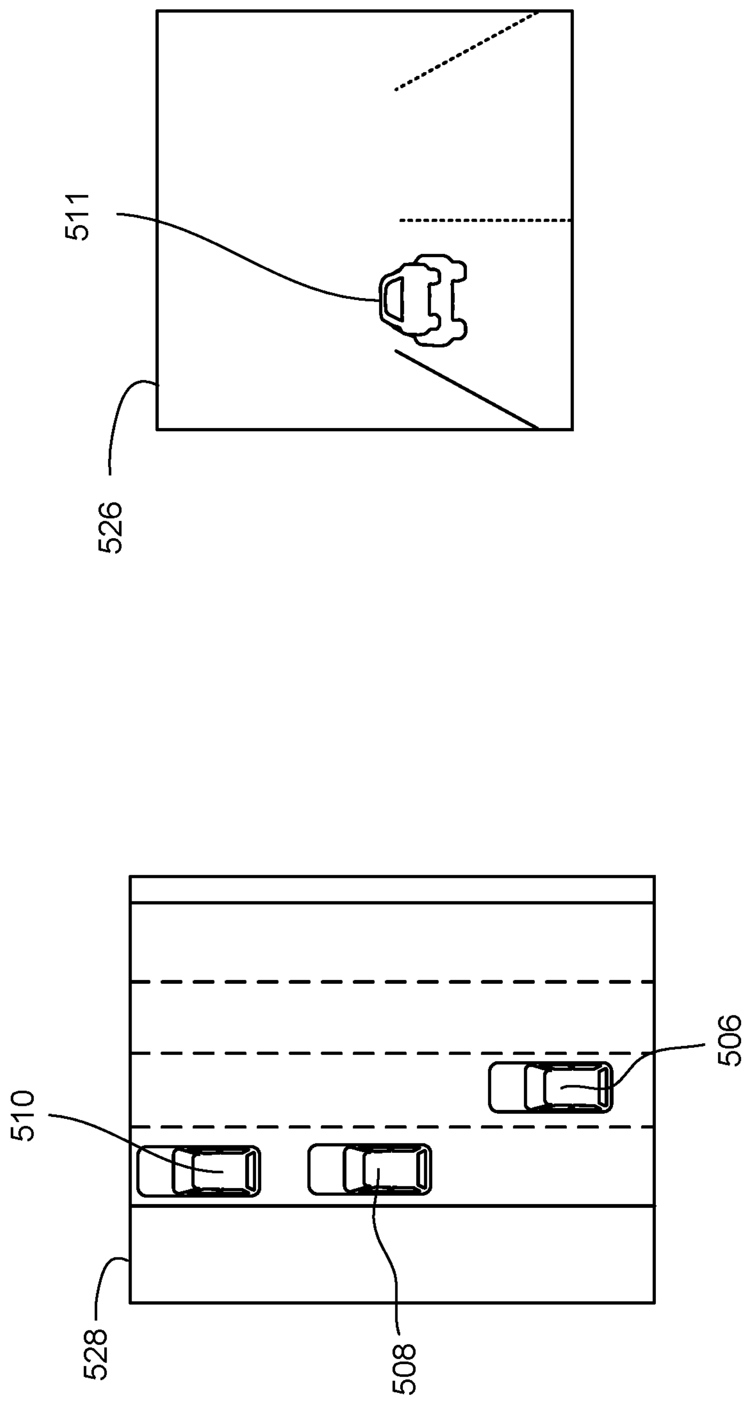

The computing device 402 may be configured to determine, with a first model 422 424, a second plurality of images 412. The second plurality of images 412 may depict the object from at least one novel view not present within the first plurality of images 410. In certain implementations, the at least one novel view may be a view of the object that differs from views of the object available from cameras 404, 406, 408 on the vehicle. For example, the novel view may include a viewing angle of the object that is not available from images 410 captured by the cameras 404, 406, 408. In certain implementations, the novel views may include views that are possible to capture from the vehicle (such as from potential viewing positions within or on the vehicle, but that differ from the actual positions of cameras 404, 406, 408 on the vehicle). In additional or alternative implementations, the novel views may include views that are not possible to capture from the vehicle (such as from viewing positions exterior to the vehicle). For example, novel views may include views of the object from several feet above the top of the car, or from several feet in front the vehicle, several feet behind the vehicle, several feet to the side of the vehicle, or combinations thereof. In certain implementations, novel views refer to a new perspective or camera angle that provides additional information compared to existing views within the first plurality of images 410. The novel views may be generated by combining information from multiple images, by using a single image from the first plurality of images 410, or combinations thereof. Novel views may be similar to an original view from the first plurality of images 410, but may have slight stochastic differences from frame to frame. Multiple novel views may be generated within the second plurality of images 412 and may provide more insight into the scene or object being observed (such as for later use in generating top view images of the scene or object). For example, FIG. 5A depicts an image 524 that may have been generated as a novel view of the same scenario as the image 504. For example, the image 524 may be generated as a view from several feet above a vehicle containing the camera that captured the image 502. As can be seen in FIG. 5B, the higher, novel view of image 524 allows for an unobstructed view of the first vehicle 510 around the other vehicle 508.

In certain implementations, the model 422 may include one or more generative models configured to generate novel view images of one or more identified objects. For example, multiple cameras on a vehicle may capture images that are used to pretrain a generative model 422 424 to generate new views of the environment surrounding the vehicle. As a specific example, images from the first plurality of images 410 may be used to pretrain the generative model 422. Based on the pretraining, the model 422 may be configured to generate new views of objects within the environment. In certain implementations, the model 422 may include a decoder model, which may be configured to generate depth maps, semantic maps, or combinations thereof for novel view images.

The computing device 402 may be configured to determine second portions 420 of at least a subset of the second plurality of images 412 that depict the object. For example, the computing device 402 may be configured to determine portions 420 of the images 412 that contain one or more objects 416. In certain implementations, the objects 416 may be the same or similar objects to the objects 414. Furthermore, the portions 420 may be identified using techniques similar to those discussed above. For example, the portions 420 may be identified as masks or bounding areas identifying portions of the images 412 that contain or otherwise depict the objects 416. In certain implementations, the portions 420 may be identified or otherwise associated with identifiers of corresponding objects, similar to the portions 418 above. In certain implementations, the same machine learning model may be used to determine the portions 420 and the portions 418.

In certain implementations, a machine learning model may be used to generate depth maps for at least a subset of the images 410, 412. In certain implementations, the model that identifies the portions 418, 420 may also determine depth maps (such as distances to one or more points on the identified objects). In additional or alternative implementations, a separate model may be used to identify the portions 418, 420 and determine the depth maps. In still further implementations, the model 422 may determine depth maps for the images 412 while generating or otherwise determining the images 412.

The computing device 402 may be configured to determine, from among the first portions 418 and the second portions 420, corresponding portions 426 that contain an occluded view 428 of the object 414 and an unobstructed view 430 of the object 414. The computing device 402 may be configured to identify, from among the first portions 418 and the second portions 420, occluded views 428 of the object 414 and unobstructed views 430 of the object 414 and to select, for each corresponding portion, at least one of the occluded views 428 and at least one of the unobstructed views 430.

Occluded views may be detected based on a percentage of a bounding box for the object that contains pixels corresponding to the object. If the percentage exceeds a predetermined threshold (such as 10%, 30%, 50%, 70%, and the like), the corresponding portion 418, 420 may be identified as an occluded view 428. If not, the corresponding portion 418, 420 may be identified as an unobstructed view 430. In additional or alternative implementations, a machine learning model may be trained to classify or otherwise distinguish between different occluded and unobstructed views. Based on these classifications, the computing device may mine or otherwise identify pairs portions 418, 420 of the images 410, 412 that correspond to the same object identifier. For example, the pairs may be identified to include one or more occluded views 428 and one or more unobstructed views 430. In certain cases, at least one portion 418, 420 for each corresponding portion 426 may originate from the first plurality of images 410 and at least one portion 418, 420 may originate from the second plurality of images 412. In additional or alternative implementations, at least a subset of the corresponding portions 426 may only contain portions 418 from the first plurality of images 410. In still further implementations, at least a subset of the corresponding portions 426 may only contain portions 420 from the second plurality of images 412. In particular implementations, the corresponding portions 426 may be determined to contain two portions 418, 420 from the images 410, 412: one portion reflecting an occluded view of an object 414 and one portion reflecting an unobstructed view of the same object 414. In certain implementations, every pair of portions 418, 420 for the object 414 possible may be determined or otherwise considered.

The computing device 402 may be configured to determine corrected views 432 for at least a subset of the corresponding portions 426. The corrected views 432 may be determined to at least partially correct for occlusion of the object within corresponding occluded views 428. The corrected views 432 may be determined for occluded views 428 based on corresponding unobstructed views 430. In particular, for each respective corresponding portion of at least a subset of the corresponding portions 426, a corrected view 432 may be determined for a respective occluded view 428 from the corresponding portion based on a respective unobstructed view 430 from the corresponding portion. For example, FIG. 5B depicts a corrected view 526 of the first vehicle 510 determined based on the unobstructed view of the first vehicle 510 in the image 524. As can be seen in FIG. 5B, the corrected view 526 includes details of the first vehicle 510 that are otherwise occluded by the vehicle 508, which may be predicted by a model 424 based on the unobstructed view in image 524 for the occluded portions of the image 504.

In certain implementations, the corrected views 432 are determined using a machine learning model, such as the model 424. In certain implementations, the model 424 may receive portions 418, 420 corresponding to the occluded view and the unobstructed view and may generate pixel values to complete areas within the occluded view to depict corresponding occluded portions of the object. In certain implementations, the model 424 may be implemented as an inpainting network model or other generative model. For example, the model 424 may use a combination of convolutional neural networks (CNNs) and generative adversarial networks (GANs) to predict the missing and occluded portions of the occluded view based on the context of the surrounding pixels and additional context provided by the unobstructed view. In certain implementations, the inpainting process may include training the model on a dataset of complete images and their corresponding masked versions, where certain regions are intentionally removed or occluded.

The computing device 402 may be configured to determine a top view image 434 based on the corrected views 432. In certain implementations, top view images 434, which may also be referred to as bird's eye views, refer to images that offer a top-down view of the vehicle and its surroundings as seen from above. Top view images 434 may provide a clear and comprehensive view of streets, buildings, vehicles, pedestrians, and other objects. Top view images 434 may be used for various purposes such as navigation, mapping, and obstacle avoidance. For example, the top view image may be determined based on the corrected views 432 and the unobstructed views 430 of the object. In particular, the corrected views 432 may be used to determine representations of the object at times in which the object may be occluded. For example, FIG. 5A also shows a top view image 502, which may have been generated based on the occluded image 504. Because the first vehicle 510 is occluded in the image 504, the corresponding generated top view image 502 may include an erroneous or incomplete representation of the first vehicle (shown by the dotted line/stippled representation of the first vehicle). By contrast, FIG. 5B shows a top view image 528 determined based on the corrected view 526. Because the corrected view 526 includes additional visual information and representation of the first vehicle 510, the corresponding top view image 528 is able to include a complete representation of the vehicle 510 even though the vehicle 510 is occluded in the captured image 504.

In certain implementations, the top view images 434 may be determined for each of at least a subset of the corresponding portions 426 based on both the unobstructed view 430 and the corresponding corrected view 432. In certain instances, a machine learning model may be configured to generate the top view images 434. In additional or alternative implementations, the top view images 434 may be determined by applying a series of image transformations to the views 430, 432.

In certain implementations, determining the top view image based on the corrected views 432 may include determining scores for the corrected views 432 and determining a subset of the corrected views 432 with corresponding scores that exceed a predetermined threshold. In such implementations, the top view image may be determined based on the subset of the corrected views 432. In certain implementations, the quality of the novel view and BEV segmentation may be assessed through a pixelwise confidence score for the corresponding portions 426 (such as for a segmentation map of the images 410, 412). In certain implementations, the scores may include a confidence score for the corrected views 432. In certain implementations, confidence scores may be calculated using model calibration with ensembling, which takes into account the uncertainty in the predictions made by the model 424 when generating the corrected views. For example, a loss measure may be determined based on the percentage of occlusion for an object within source images for the corrected views 432 (such as within occluded views 428 of corresponding pairs used to generate the corrected view 432). In certain implementations, the percentage of occlusion may be determined by comparing pixel values over frames (such as frames used to determine the corrected view). A lower confidence score may be used as an occlusion proxy, indicating that the predictions made when determining the corrected view are less average may not be accurate. In certain implementations, the threshold may be determined based on a cumulative average over time. For example, if a large truck blocks most of a scene and causes occlusion for multiple frames, the confidence score in that particular time frame may be low. However, by aggregating confidence scores over previous time frames, the proposed techniques may compensate for such low-confidence periods based on previous and/or following frames (such as based on frames with higher confidence scores).

In certain implementations, the scores additionally or alternatively include a temporal consistency score between corrected views 432 and unobstructed views 430 for consecutive image frames. In certain implementations, temporal consistency scores may be determined based on the similarity between two consecutive frames (such as within a sequence of images contained within the first plurality of images 410, the second plurality of images 412, or combinations thereof). Temporal consistency scores may be determined by comparing the novel views generated from the same query rays in both frames, where query rays refer to a set of virtual lines projected from a camera's viewpoint onto an image and may be used to identify and track objects in the surrounding environment between different images. Such processing may be performed individually for each frame, but may consider more than one previous frame. The temporal consistency score may also be calculated by analyzing differences between views within corresponding portions 426. In certain implementations, the temporal consistency scores may be used to predict the confidence score for each frame (such as with lower temporal consistency scores decreasing confidence scores for corresponding frames). In various implementations, the temporal consistency scores may be determined be based on various factors, such as a top view segmentation map, a novel view segmentation map, a novel view depth map, and the like.

In certain implementations, the scores may include both a confidence score and a temporal consistency score. For example, confidence scores may be associated with a first predetermined threshold and temporal consistency scores may be associated with a second predetermined threshold. In such instances, the subset of the corrected view may be identified as corrected views 432 with a confidence score that exceeds the first predetermined threshold and a temporal consistency score that exceeds the second predetermined threshold.

Figure 6:
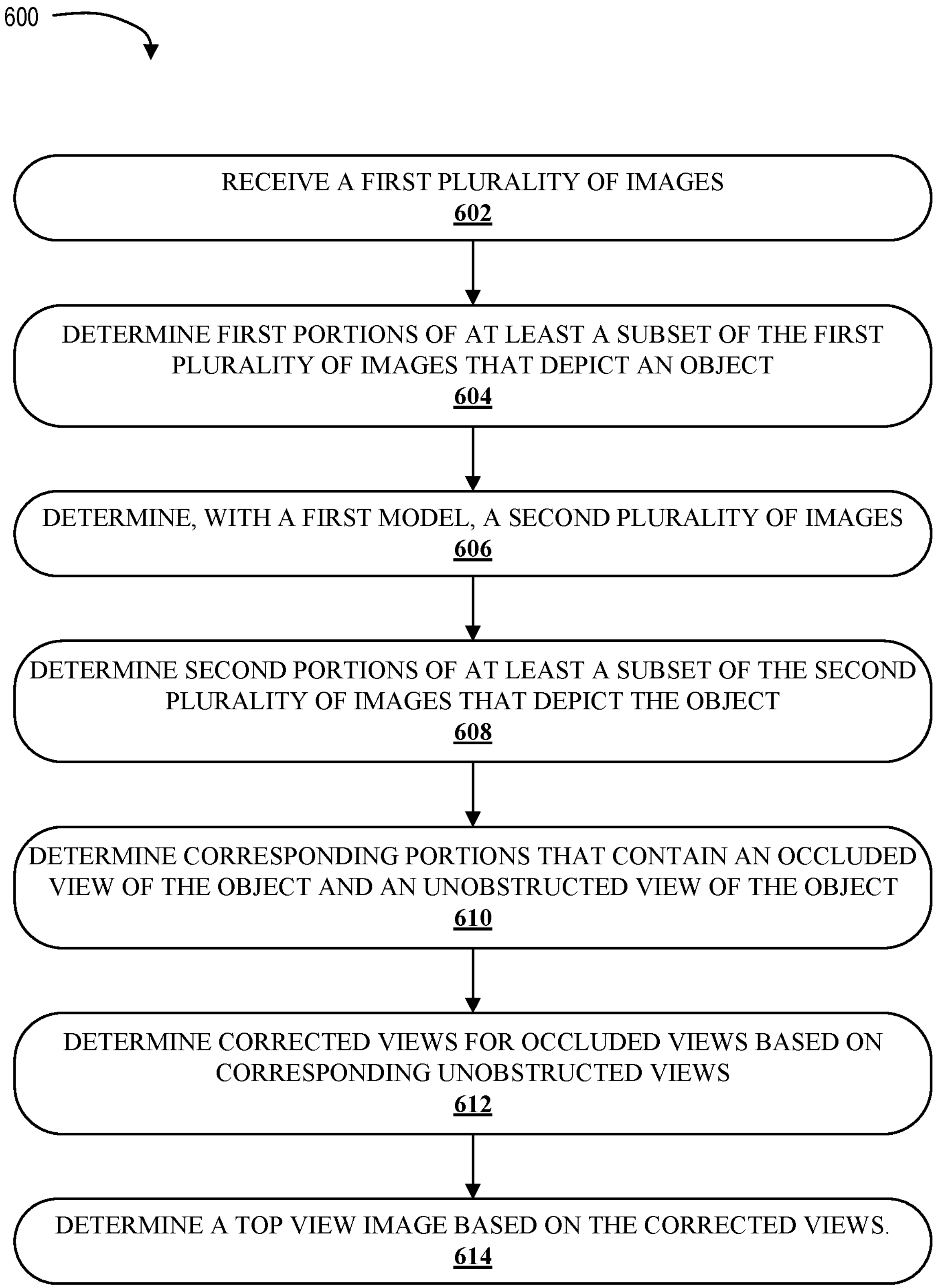
FIG. 6 is a flow chart illustrating an example method for occluded object detection and correction according to an exemplary embodiment of the present disclosure.

One method of performing image processing according to embodiments described above is shown in FIG. 6. FIG. 6 is a flow chart illustrating an example method 600 for occluded object detection and correction. The method may be performed by one or more of the above systems, such as the systems 100, 200, 300, 400.

The method 600 includes receiving a first plurality of images (block 602). For example, the computing device 402 may receive a first plurality of images 410. In certain implementations, the first plurality of images 410 depict one or more areas surrounding a vehicle. In certain implementations, the first plurality of images 410 are captured from cameras 404, 406, 408 on the vehicle.

The method 600 includes determining first portions of at least a subset of the first plurality of images that depict an object (block 604). For example, the computing device 402 may determine first portions 418 of at least a subset of the first plurality of images 410 that depict an object 414. In certain implementations, the first portions 418 may be determined as masks identifying portions of the first plurality of images 410 that contain the object 414. In certain implementations, the masks are determined on a pixelwise basis to identify pixels within at least the subset of the first plurality of images 410 that depict the object 414. In certain implementations, the first plurality of images 410 depict multiple objects 414, 416. In such instances, the method 600 may be repeated at least in part (such as one or more of blocks 602-612) for each of at least a subset of the objects 414, 416. In such implementations, the object may be a current object in a processing pipeline for the first plurality of images 410. For example, the computing device 402 may be configured to iterate through each of at least a subset of the objects 414, 416.

The method 600 includes determining, with a first model, a second plurality of images (block 606). For example, the computing device 402 may determine, with a first model 422, a second plurality of images 412. In certain implementations, the second plurality of images 412 depict the object 414 from at least one novel view not present within the first plurality of images 410. The novel views may be generated by combining information from multiple images or by using a single image from the first plurality of images 410. In certain implementations, one or more generative models may be configured to generate the novel view images. In certain implementations, the first model 422 or another model may be used to generate depth maps for the second plurality of images 412. For example, the model 422 may include a decoder model configured to generate depth and semantic maps for the images 412.

The method 600 includes determining second portions of at least a subset of the second plurality of images that depict the object (block 608). For example, the computing device 402 may determine second portions 420 of at least a subset of the second plurality of images 412 that depict the object. In certain implementations, the same model may determine both the first portions 418 and the second portions 420. In additional or alternative implementations, the second portions 420 may be determined by a separate model from the first portions 418 (such as by a decoder model of the model 422).

The method 600 includes determining, from among the first portions and the second portions, corresponding portions that contain an occluded view of the object and an unobstructed view of the object (block 610). For example, the computing device 402 may determine, from among the first portions 418 and the second portions 420, corresponding portions 426 that contain an occluded view 428 of the object and an unobstructed view 430 of the object. In certain implementations, the method 600 may further include identifying, from among the first portions 418 and the second portions 420, occluded views 428 of the object and unobstructed views 430 of the object. In certain implementations, selecting, for each corresponding portion 426, at least one of the occluded views 428 and at least one of the unobstructed views 430.

The method 600 includes determining, for at least a subset of the corresponding portions, corrected views for occluded views (block 612). For example, the computing device 402 may determine, for at least a subset of the corresponding portions 426, corrected views 432 for occluded views 428. The corrected views 432 may be determined to at least partially correct for occlusion of the object within corresponding occluded views 428. The corrected views 432 may be determined based on corresponding unobstructed views 430 for the occluded views 428 (such as unobstructed views 430 from the same corresponding portion 426 as the occluded views 428. In particular, for each respective corresponding portion of at least a subset of the corresponding portions, a corrected view may be determined for a respective occluded view from the respective corresponding portion based on a respect unobstructed view from the respective corresponding portion. In certain implementations, the corrected views 432 are determined using a machine learning model 424.

The method 600 includes determining a top view image based on the corrected views (block 614). For example, the computing device 402 may determine a top view image 434 based on the corrected views 432. For example, the top view image 434 may be determined based on the corrected views 432 and the unobstructed views 430 of the object. In particular, the corrected views 432 may be used to determine representations of the object at times in which the object may be occluded.

In certain implementations, the method 600 further includes determining the top view image based on the corrected views 432 includes determining scores for the corrected views 432 and determining a subset of the corrected views 432 with corresponding scores that exceed a predetermined threshold. In such instances, the top view image may be determined based on the subset of the corrected views 432. In certain implementations, the scores include a confidence score for the updated version. In certain implementations, confidence scores may be calculated using model calibration with ensembling, which takes into account the uncertainty in the predictions made by the model 424. For example, a loss measure for the confidence score may be determined based on the percentage of occlusion for an object within source images for the corrected views 432 (such as within occluded views 428 of corresponding pairs used to generate the corrected view).

In certain implementations, the scores include a temporal consistency score between corrected views 432 and unobstructed views 430 for consecutive image frames. In certain implementations, temporal consistency scores may be determined based on the similarity between two consecutive frames (such as within a sequence of images contained within the first plurality of images 410, the second plurality of images 412, or combinations thereof). Temporal consistency scores may be determined by comparing the novel views generated from the same query rays in both frames. The temporal consistency score may also be calculated by analyzing differences between views within corresponding pairs.

In certain implementations, the scores may include both a confidence score and a temporal consistency score. for example, confidence scores may be associated with a first predetermined threshold and temporal consistency scores may be associated with a second predetermined threshold. In such instances, the subset of the corrected views may be identified as corrected views 432 with a confidence score that exceeds the first predetermined threshold and a temporal consistency score that exceeds the second predetermined threshold.

It is noted that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 1-3. As another example, one or more blocks associated with FIG. 5 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. A first aspect includes a method for image processing that includes receiving a first plurality of images. The method also includes determining first portions of at least a subset of the first plurality of images that depict an object. The method also includes determining a second plurality of images based on the first plurality of images. The method also includes determining second portions of at least a subset of the second plurality of images that depict the object. The method also includes determining, from among the first portions and the second portions, corresponding portions that contain an occluded view of the object and an unobstructed view of the object. The method also includes determining, for at least a subset of the corresponding portions, corrected views for occluded views based on corresponding unobstructed views, where the corrected views at least partially correct for occlusion of the object within the occluded views. The method also includes determining a top view image based on the corrected views.

In a second aspect, in combination with the first aspect, the first plurality of images depict one or more areas surrounding a vehicle.

In a third aspect, in combination with the third aspect, the first plurality of images of captured from cameras on the vehicle.

In a fourth aspect, in combination with the third aspect, the second plurality of images depict the object from at least one novel view not present within the first plurality of images, and the at least one novel view is a viewing angle of the object that differ from viewing angles of the object from the cameras on the vehicle.

In a fifth aspect, in combination with one or more of the first aspect through the fourth aspect, the method further includes identifying, from among the first portions and the second portions, occluded views of the object and unobstructed views of the object; and selecting, for each corresponding portion, at least one of the occluded views and at least one of the unobstructed views.

In a sixth aspect, in combination with one or more of the first aspect through the fifth aspect, determining the corrected views may include determining, for each respective corresponding portion of at least a subset of the corresponding portions, a corrected view for a respective occluded view from the respective corresponding portion based on a respective unobstructed view from the respective corresponding portion.

In a seventh aspect, in combination with one or more of the first aspect through the sixth aspect, determining the top view image based on the corrected views may include determining scores for the corrected views; determining a subset of the corrected views with corresponding scores that exceed a predetermined threshold; and determining the top view image based on the subset of the corrected views.

In an eighth aspect, in combination with the seventh aspect, the scores include confidence scores indicating prediction confidences for the corrected views.

In a ninth aspect, in combination with one or more of the seventh aspect through the eighth aspect, the scores include temporal may include scores between corrected views and unobstructed views for consecutive image frames.

In a tenth aspect, in combination with one or more of the first aspect through the ninth aspect, the first portions are masks identifying portions of the first plurality of images that contain the object.

In an eleventh aspect, in combination with the tenth aspect, the masks are determined on a pixelwise basis to identify pixels within at least the subset of the first plurality of images that depict the object.

In a twelfth aspect, in combination with one or more of the first aspect through the eleventh aspect, the first plurality of images depict multiple objects and where the method is repeated at least in part for each of the objects prior to determining the top view image.

A thirteenth aspect includes an apparatus that includes a memory storing processor-readable code and at least one processor coupled to the memory. The at least one processor may be configured to execute the processor-readable code to cause the at least one processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining, from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a fourteenth aspect, in combination with the thirteenth aspect, the first plurality of images depict one or more areas surrounding a vehicle.

In a fifteenth aspect, in combination with the fourteenth aspect, the first plurality of images of captured from cameras on the vehicle.

In a sixteenth aspect, in combination with the fifteenth aspect, the second plurality of images depict the object from at least one novel view not present within the first plurality of images, and the at least one novel view is a viewing angle of the object that differ from viewing angles of the object from the cameras on the vehicle.

In a seventeenth aspect, in combination with one or more of the thirteenth aspect through the sixteenth aspect, the operations further include identifying, from among the first portions and the second portions, occluded views of the object and unobstructed views of the object; and selecting, for each corresponding portion, at least one of the occluded views and at least one of the unobstructed views.

In an eighteenth aspect, in combination with one or more of the thirteenth aspect through the seventeenth aspect, determining the corrected views may include determining, for each respective corresponding portion of at least a subset of the corresponding portions, a corrected view for a respective occluded view from the respective corresponding portion based on a respective unobstructed view from the respective corresponding portion.

In a nineteenth aspect, in combination with one or more of the thirteenth aspect through the eighteenth aspect, determining the top view image based on the corrected views may include determining scores for the corrected views; determining a subset of the corrected views with corresponding scores that exceed a predetermined threshold; and determining the top view image based on the subset of the corrected views.

In a twentieth aspect, in combination with the nineteenth aspect, the scores include confidence scores indicating prediction confidences for the corrected views.

In a twenty-first aspect, in combination with one or more of the nineteenth aspect through the twentieth aspect, the scores include temporal may include scores between corrected views and unobstructed views for consecutive image frames.

A twenty-second aspect includes a non-transitory computer-readable medium storing instructions that, when executed by a process, cause the processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining, from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views.

In a twenty-third aspect, in combination with the twenty-second aspect, the operations further include identifying, from among the first portions and the second portions, occluded views of the object and unobstructed views of the object; and selecting, for each corresponding portion, at least one of the occluded views and at least one of the unobstructed views.

In a twenty-fourth aspect, in combination with one or more of the twenty-second aspect through the twenty-third aspect, determining the corrected views may include determining, for each respective corresponding portion of at least a subset of the corresponding portions, a corrected view for a respective occluded view from the respective corresponding portion based on a respective unobstructed view from the respective corresponding portion.

In a twenty-fifth aspect, in combination with one or more of the twenty-second aspect through the twenty-fourth aspect, determining the top view image based on the corrected views may include: determining scores for the corrected views; determining a subset of the corrected views with corresponding scores that exceed a predetermined threshold; and determining the top view image based on the subset of the corrected views.

In a twenty-sixth aspect, in combination with the twenty-fifth aspect, the scores include at least one of confidence scores indicating prediction confidences for the corrected views, temporal may include scores between corrected views and unobstructed views for consecutive image frames, or combinations thereof.

A twenty-seventh aspect includes a vehicle that includes a memory storing processor-readable code and at least one processor coupled to the memory. The at least one processor may be configured to execute the processor-readable code to cause the at least one processor to perform operations including receiving a first plurality of images; determining first portions of at least a subset of the first plurality of images that depict an object. The operations may also include determining a second plurality of images based on the first plurality of images. The operations may also include determining second portions of at least a subset of the second plurality of images that depict the object. The operations may also include determining, from among the first portions and the second portions, corresponding portions that contain an occluded view of the object and an unobstructed view of the object. The operations may also include determining, for at least a subset of the corresponding portions, corrected views for occluded views based on corresponding unobstructed views. The corrected views at least partially correct for occlusion of the object within the occluded views. The operations may also include determining a top view image based on the corrected views.

In a twenty-eighth aspect, in combination with the twenty-seventh aspect, the operations further include identifying, from among the first portions and the second portions, occluded views of the object and unobstructed views of the object; and selecting, for each corresponding portion, at least one of the occluded views and at least one of the unobstructed views.

In a twenty-ninth aspect, in combination with one or more of the twenty-seventh aspect through the twenty-eighth aspect, determining the corrected views may include determining, for each respective corresponding portion of at least a subset of the corresponding portions, a corrected view for a respective occluded view from the respective corresponding portion based on a respective unobstructed view from the respective corresponding portion.

In a thirtieth aspect, in combination with one or more of the twenty-seventh aspect through the twenty-ninth aspect, determining the top view image based on the corrected views includes determining scores for the corrected views; determining a subset of the corrected views with corresponding scores that exceed a predetermined threshold; and determining the top view image based on the subset of the corrected views.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing comprising:

receiving a first plurality of images captured from cameras on a vehicle;

determining first portions of at least a subset of the first plurality of images that depict an object;

determining, with a first machine learning model, a second plurality of images based on the first plurality of images, wherein the first machine learning model is trained at least in part using the first plurality of images, and wherein the second plurality of images are artificially generated using the first machine learning model and depict the object from at least one novel view not present within the first plurality of images;

determining second portions of at least a subset of the second plurality of images that depict the object;

determining, from among the first portions and the second portions, corresponding portions that contain an occluded view of the object and an unobstructed view of the object;

determining, for at least a subset of the corresponding portions, corrected views for occluded views based on corresponding unobstructed views, wherein the corrected views at least partially correct for occlusion of the object within the occluded views; and determining a top view image of an area surrounding the vehicle based on the corrected views.

2. The method of claim 1, wherein the first plurality of images depict one or more areas surrounding the vehicle.

3. The method of claim 1, wherein the at least one novel view is a viewing angle of the object that differs from viewing angles of the object from the cameras on the vehicle.

4. The method of claim 1, further comprising:

identifying, from among the first portions and the second portions, occluded views of the object and unobstructed views of the object; and selecting, for each corresponding portion, at least one of the occluded views and at least one of the unobstructed views.

5. The method of claim 1, wherein determining the corrected views comprises determining, for each respective corresponding portion of at least a subset of the corresponding portions, a corrected view for a respective occluded view from the respective corresponding portion based on a respective unobstructed view from the respective corresponding portion.

6. The method of claim 1, wherein determining the top view image based on the corrected views comprises:
- determining scores for the corrected views;
- determining a subset of the corrected views with corresponding scores that exceed a predetermined threshold; and
- determining the top view image based on the subset of the corrected views.

7. The method of claim 6, wherein the scores include confidence scores indicating prediction confidences for the corrected views.

8. The method of claim 6, wherein the scores include temporal consistency scores between corrected views and unobstructed views for consecutive image frames.

9. The method of claim 1, wherein the first portions are masks identifying portions of the first plurality of images that contain the object.

10. The method of claim 9, wherein the masks are determined on a pixelwise basis to identify pixels within at least the subset of the first plurality of images that depict the object.

11. The method of claim 1, wherein the first plurality of images depict multiple objects and wherein the method is repeated at least in part for each of the objects prior to determining the top view image.

12. The method according to claim 1, wherein the corrected views are determined using a second machine learning model and contain artificially generated pixel values that at least partially correct for occlusion of the object within the occluded views.

13. An apparatus, comprising:
- a memory storing processor-readable code; and
- at least one processor coupled to the memory, the at least one processor configured to execute the processor-readable code to cause the at least one processor to perform operations including:
- receiving a first plurality of images captured from cameras on a vehicle;
- determining first portions of at least a subset of the first plurality of images that depict an object;
- determining, with a first machine learning model, a second plurality of images based on the first plurality of images, wherein the first machine learning model is trained at least in part using the first plurality of images, and wherein the second plurality of images are artificially generated using the first machine learning model and depict the object from at least one novel view not present within the first plurality of images;
- determining second portions of at least a subset of the second plurality of images that depict the object;
- determining, from among the first portions and the second portions, corresponding portions that contain an occluded view of the object and an unobstructed view of the object;
- determining, for at least a subset of the corresponding portions, corrected views for occluded views based on corresponding unobstructed views, wherein the corrected views at least partially correct for occlusion of the object within the occluded views; and
- determining a top view image of an area surrounding the vehicle based on the corrected views.

14. The apparatus of claim 13, wherein the first plurality of images depict one or more areas surrounding the vehicle.

15. The apparatus of claim 13, wherein the at least one novel view is a viewing angle of the object that differs from viewing angles of the object from the cameras on the vehicle.

16. The apparatus of claim 13, wherein the operations further comprise:
- identifying, from among the first portions and the second portions, occluded views of the object and unobstructed views of the object; and
- selecting, for each corresponding portion, at least one of the occluded views and at least one of the unobstructed views.

17. The apparatus of claim 13, wherein determining the corrected views comprises determining, for each respective corresponding portion of at least a subset of the corresponding portions, a corrected view for a respective occluded view from the respective corresponding portion based on a respective unobstructed view from the respective corresponding portion.

18. The apparatus of claim 13, wherein determining the top view image based on the corrected views comprises:
- determining scores for the corrected views;
- determining a subset of the corrected views with corresponding scores that exceed a predetermined threshold; and
- determining the top view image based on the subset of the corrected views.

19. The apparatus of claim 18, wherein the scores include confidence scores indicating prediction confidences for the corrected views.

20. The apparatus of claim 18, wherein the scores include temporal consistency scores between corrected views and unobstructed views for consecutive image frames.

21. The apparatus of claim 13, wherein the corrected views are determined using a second machine learning model and contain artificially generated pixel values that at least partially correct for occlusion of the object within the occluded views.

22. A non-transitory computer-readable medium storing instructions that, when executed by a processor, cause the processor to perform operations comprising:
- receiving a first plurality of images captured from cameras on a vehicle;
- determining first portions of at least a subset of the first plurality of images that depict an object;
- determining, with a first machine learning model, a second plurality of images based on the first plurality of images, wherein the first machine learning model is trained at least in part using the first plurality of images, and wherein the second plurality of images are artificially generated using the first machine learning model and depict the object from at least one novel view not present within the first plurality of images;
- determining second portions of at least a subset of the second plurality of images that depict the object;
- determining, from among the first portions and the second portions, corresponding portions that contain an occluded view of the object and an unobstructed view of the object;
- determining, for at least a subset of the corresponding portions, corrected views for occluded views based on corresponding unobstructed views, wherein the corrected views at least partially correct for occlusion of the object within the occluded views; and determining a top view image of an area surrounding the vehicle based on the corrected views.

23. The non-transitory computer-readable medium of claim 22, wherein the operations further comprise:

identifying, from among the first portions and the second portions, occluded views of the object and unobstructed views of the object; and selecting, for each corresponding portion, at least one of the occluded views and at least one of the unobstructed views.

24. The non-transitory computer-readable medium of claim 22, wherein determining the corrected views comprises determining, for each respective corresponding portion of at least a subset of the corresponding portions, a corrected view for a respective occluded view from the respective corresponding portion based on a respective unobstructed view from the respective corresponding portion.

25. The non-transitory computer-readable medium of claim 22, wherein determining the top view image based on the corrected views comprises:

determining scores for the corrected views;

determining a subset of the corrected views with corresponding scores that exceed a predetermined threshold; and determining the top view image based on the subset of the corrected views.

26. The non-transitory computer-readable medium of claim 25, wherein the scores include at least one of confidence scores indicating prediction confidences for the corrected views, temporal consistency scores between corrected views and unobstructed views for consecutive image frames, or combinations thereof.

27. A vehicle, comprising:

a memory storing processor-readable code; and at least one processor coupled to the memory, the at least one processor configured to execute the processor-readable code to cause the at least one processor to perform operations including:

receiving a first plurality of images captured from cameras on a vehicle;

determining first portions of at least a subset of the first plurality of images that depict an object;

determining, with a first machine learning model, a second plurality of images based on the first plurality of images, wherein the first machine learning model is trained at least in part using the first plurality of images, and wherein the second plurality of images are artificially generated using the first machine learning model and depict the object from at least one novel view not present within the first plurality of images;

determining second portions of at least a subset of the second plurality of images that depict the object;

determining, from among the first portions and the second portions, corresponding portions that contain an occluded view of the object and an unobstructed view of the object;

determining, for at least a subset of the corresponding portions, corrected views for occluded views based on corresponding unobstructed views, wherein the corrected views at least partially correct for occlusion of the object within the occluded views; and determining a top view image of an area surrounding the vehicle based on the corrected views.

28. The vehicle of claim 27, wherein the operations further comprise:

identifying, from among the first portions and the second portions, occluded views of the object and unobstructed views of the object; and selecting, for each corresponding portion, at least one of the occluded views and at least one of the unobstructed views.

29. The vehicle of claim 27, wherein determining the corrected views comprises determining, for each respective corresponding portion of at least a subset of the corresponding portions, a corrected view for a respective occluded view from the respective corresponding portion based on a respective unobstructed view from the respective corresponding portion.

30. The vehicle of claim 27, wherein determining the top view image based on the corrected views comprises:

determining scores for the corrected views;

determining a subset of the corrected views with corresponding scores that exceed a predetermined threshold; and determining the top view image based on the subset of the corrected views.

* * * * *